Aug. 1, 1967 D. J. HARDY ETAL 3,333,650
FLEXIBLE COMPONENTS FOR GROUND EFFECT VEHICLES
Filed June 3, 1965 5 Sheets-Sheet 1

Aug. 1, 1967 D. J. HARDY ETAL 3,333,650
FLEXIBLE COMPONENTS FOR GROUND EFFECT VEHICLES
Filed June 3, 1965 5 Sheets-Sheet 4

United States Patent Office 3,333,650
Patented Aug. 1, 1967

3,333,650
FLEXIBLE COMPONENTS FOR GROUND EFFECT VEHICLES
Derek James Hardy and Lavis Albert Henry Riddle, Isle of Wight, England, assignors to Westland Aircraft Limited, Yeovil, Somerset, England
Filed June 3, 1965, Ser. No. 460,948
Claims priority, application Great Britain, June 27, 1964, 26,688/64
13 Claims. (Cl. 180—7)

This invention relates to ground effect machines provided with a flexible skirting assembly acting as a barrier to the escape of at least part of the air or gas cushion. The air or gas cushion may be subdivided into compartments for stability purposes, by partitions of flexible construction depending from the rigid base structure of the ground effect machine. It is with a novel form of construction of a flexible skirting assembly and/or flexible partitions, which are generally disposed substantially parallel to the longitudinal axis of the machine, that this invention is particularly concerned.

According to one aspect of the present invention, we provide a flexible understructure for a ground effect machine, comprising a plurality of flexible members for depending contiguously from a ground effect machine to form a wall extending longitudinally in the general fore-and-aft direction of the machine, each of the members having a V configuration when viewed in elevation longitudinally of the wall and a substantially untapered configuration when viewed in elevation transversely of the wall, the horizontal extent of the upper portion of each member as viewed transversely of the wall being substantially less than the horizontal extent of the upper portion of the member as viewed longitudinally of the wall, whereby each member is more flexible in the fore-and-aft direction of the wall than in a direction transversely of the wall. Also according to the invention we provide a skirt assembly for a ground effect machine including a plurality of flexible members having greater resistance to bending in the plane transverse to the machine than in the fore-and-aft plane, the members depending contiguously from the underside of the machine to form a wall, characterized in that each of the flexible members consists of at least two flexible tubes extending from a resilient membrane and being spaced apart at their upper ends and being joined together at their lower ends.

The objects and advantages of the invention will become more readily apparent from the following detailed description, with reference to the accompanying drawings, which are by way of example, and in which.

In carrying the invention into effect according to one convenient form, a ground effect machine is provided with a flexible skirting assembly which is adapted to depend from the underside of the machine and to be in fluid communication with a source of pressurised air or gas. Those sections of the skirting assembly disposed along the sides of the machine are substantially parallel to the longitudinal axis, and comprise a plurality of flexible members generally indicated at 1, forming a flexible wall or walls to retard the escape of air or gas from the cushion and also provide the means through which air or gas is discharged for generating and maintaining the cushion on which the machine rides. For stability purposes a longitudinal keel member is provided, and this member forms a wall subdividing the air cushion along the longitudinal centre line of the machine and for the greater part of its length. The whole or part of the keel member consists of a plurality of flexible members generally indicated at 2, and these are similar in construction to the flexible member 1 disposed along the sides of the machine, but although fed with pressurised air from a keel duct, would not from preference be provided with nozzles at their lower ends. The flexible components 1 and 2 are assembled in a contiguous side-by-side relationship and when inflated by air pressure from a fan or compressor, provided to generate the air cushion, present a barrier to the passage of air either from the air cushion to the surrounding atmosphere, or from one subdivision of the air cushion area to another.

The cross-section of the individual flexible members 1 and 2 along a line substantially normal to the longitudinal axis of the machine is V-shaped, tapering towards the bottom of the member, and these may be fabricated in accordance with either of two embodiments of the invention.

Figure 1:
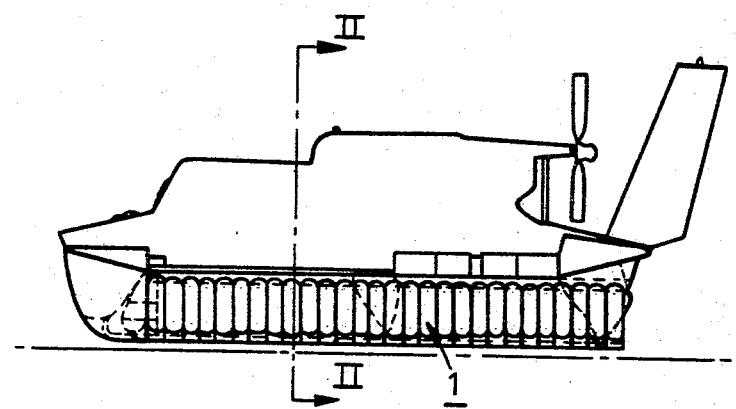
FIG. 1 is a diagrammatic side view of a ground effect machine according to the invention.
Figure 2:
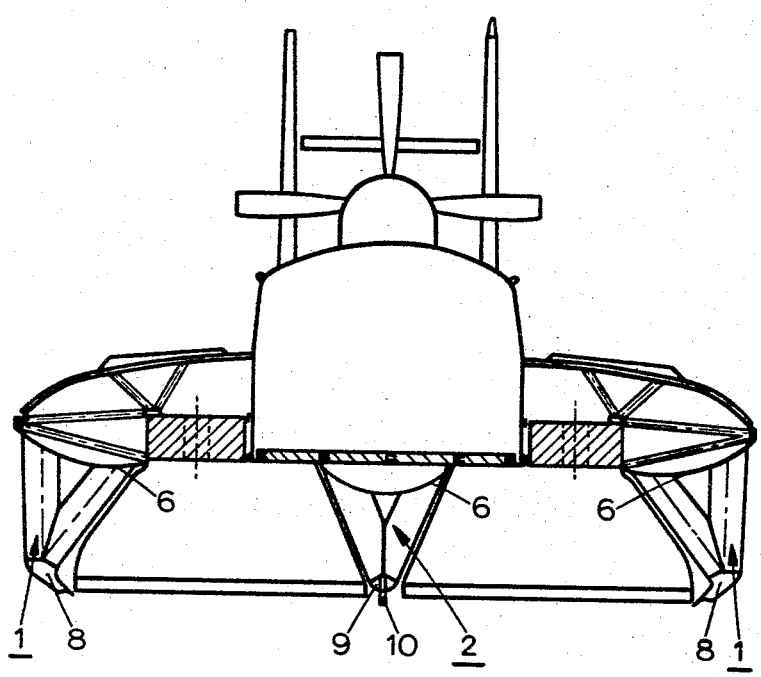
FIGURE 2 is a section of the ground effect machine along line II—II of FIGURE 1 and on a larger scale.
Figure 3:
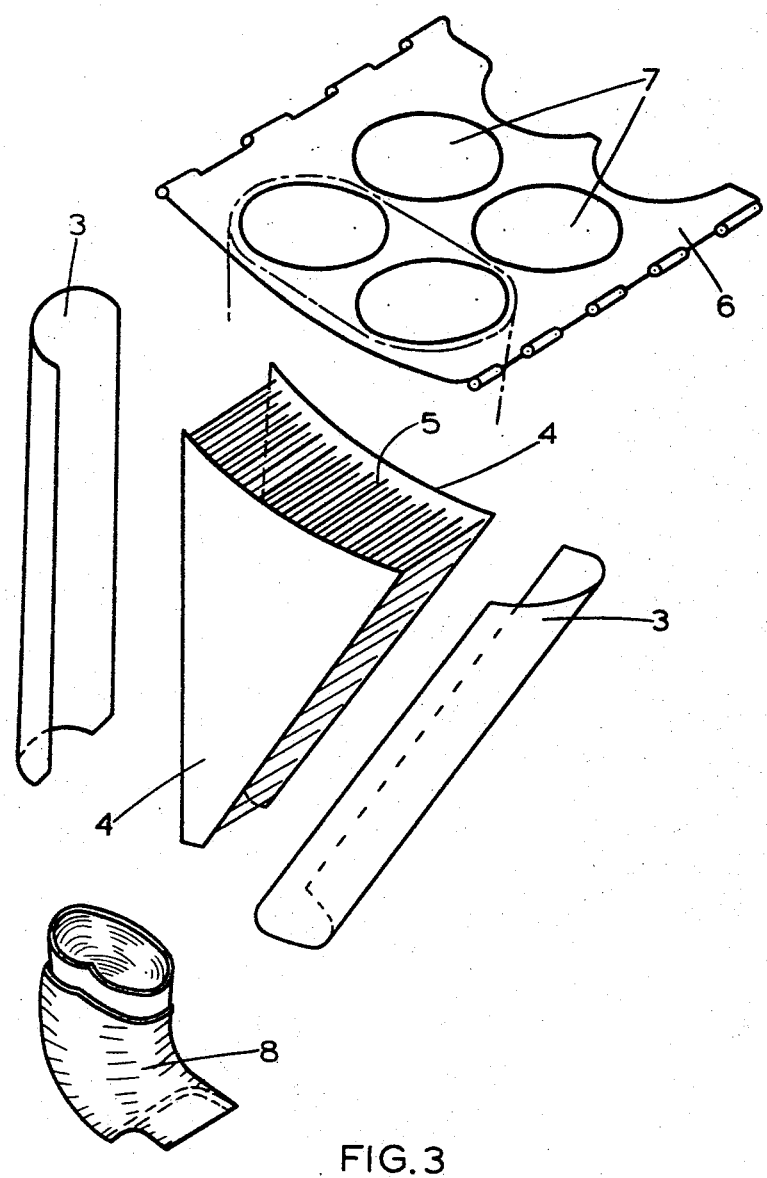
FIGURE 3 is an exploded view of one form of construction of a flexible member included in the flexible skirting assembly of a ground effect machine according to the invention.
Figure 4:
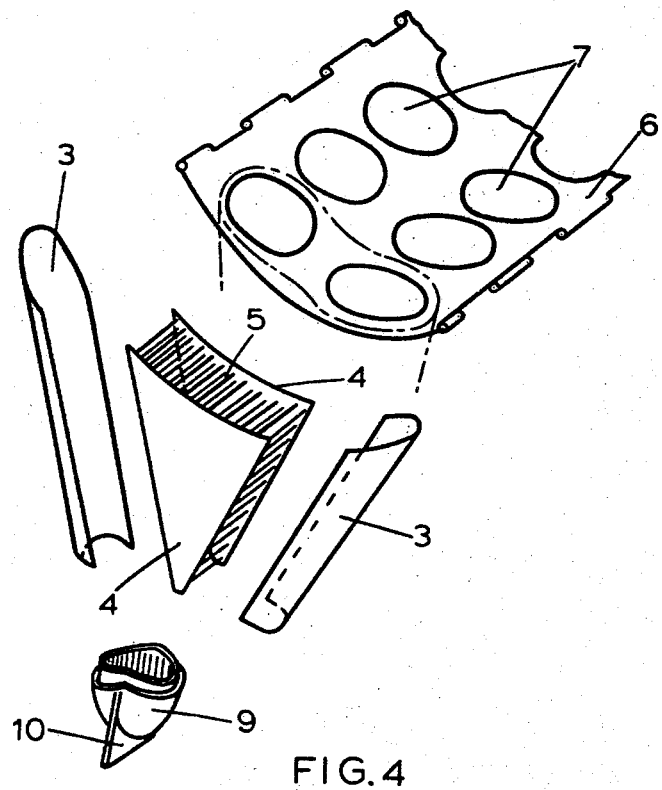
FIGURE 4 is an exploded view of one form of construction of a flexible member included in a longitudinal keel of a ground effect machine according to the invention.

Referring to FIGURES 3 and 4 illustrating one embodiment, the tapering walls 3 of each individual flexible member 1 or 2 comprise semi-circular sheets of flexible, impermeable material which, when formed to the sides of opposed triangular sheets 4, are concave to each other. The triangular sheets 4 are also of impermeable material spaced apart to the required distance to form a duct and held in displaced relationship and to the required shape by a plurality of tension members 5, which prevent bulging of the members when subjected to internal air pressure. The sheets 3 are attached to the edges of the triangular sheets 4 by bonding, vulcanising or any other suitable method of attaching one piece of flexible material to another.

Each member 1 or 2 is bonded to and depends from an attachment sheet 6, also of flexible impermeable material. The sheet 6 is itself releasably attached, by draw pins or similar means, to the rigid body structure of the machine, either across the inlet to the peripheral duct or under the base platform of the machine according to whether it is supporting peripheral skirt members 1 or keel members 2. Holes 7, of sufficient size to allow an unrestricted flow of air, are provided in each attachment sheet 6, such that when the flexible members 1 and 2 are assembled to the sheet 6 pressurised air or gas from the fan or compressor (not shown) flows through into the members 1 or 2 and thence, in the case of members 1, to jet nozzles 8. Fluid discharged from each nozzle 8 of the members 1 contributes to the generation and maintenance of at least part of the air cushion or cushions.

The nozzles 8 forming the lowest portion of each peripheral skirt member 1 are comprised of moulded rubber or like material, and may be of any required shape and reinforced with means to prevent abrasion.

In the case of the keel members 2, each member comprises a moulded rubber tip 9 which, in the preferred form, provides a blanking piece for the member 2. However, there is no reason why the keel members 2 should not be provided with nozzles, if desired, but since they would be disposed along the centre line of the machine, the nozzles would be arranged to discharge their jets vertically downwards. A flexible blade member 10 is formed onto the moulded tip 9 and protrudes downwardly therefrom along the longitudinal axis of the machine. Drain holes (not shown) are incorporated where the keel member 2 has been substantially sealed by blanking piece 9. These allow any water trapped in the member to escape.

Figure 6:
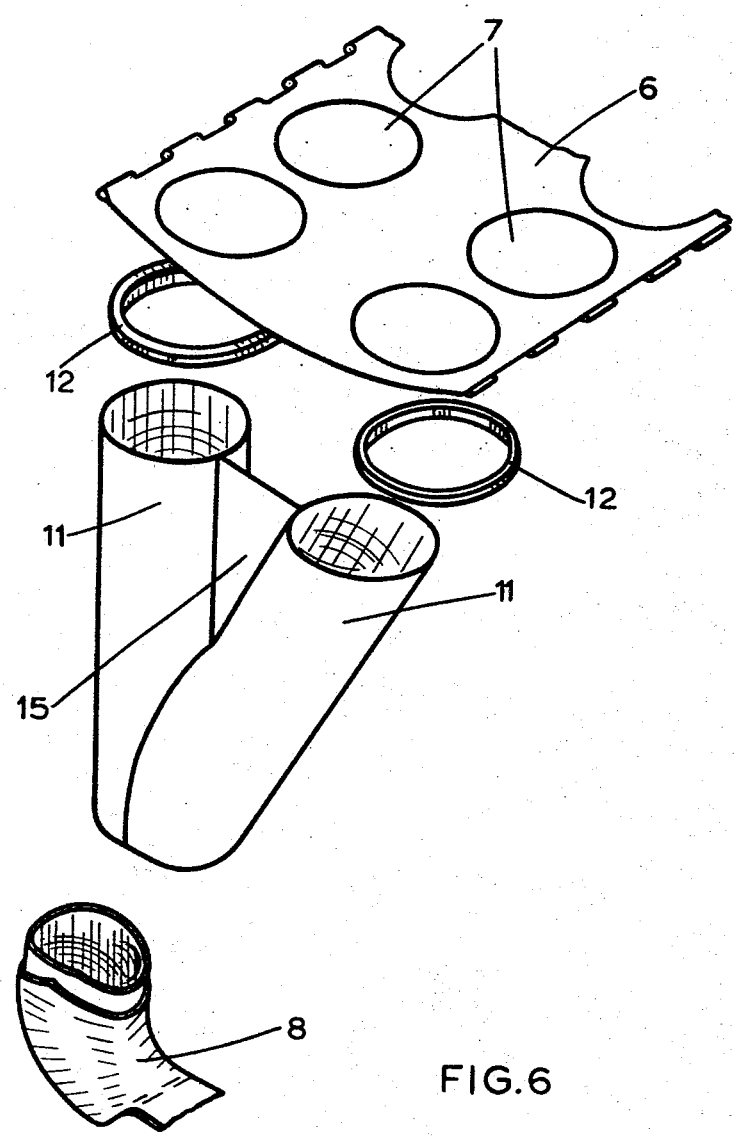
FIGURES 6 and 7 are exploded views of alternative forms of construction of flexible components included in a flexible skirting assembly or a longitudinal keel respectively, of a ground effect machine according to the invention.
Figure 7:
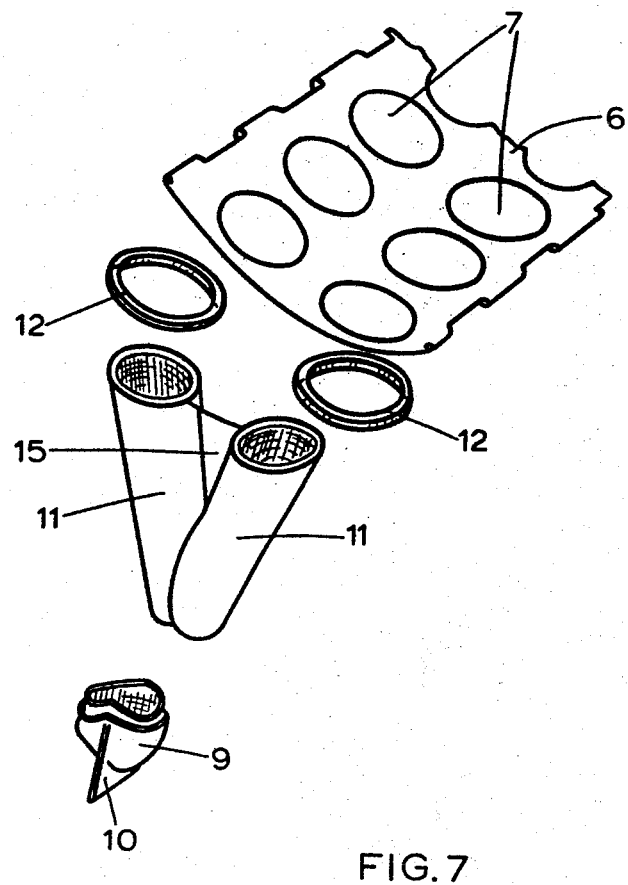

In carrying the invention into effect according to another embodiment, reference to FIGURES 6 and 7 illustrates V-shaped members, which co-operate to form either the flexible peripheral skirts or the flexible keel members in like manner to those hereinbefore described. In this embodiment, the members 1 or 2 are comprised of two convergent flexible tubes 11 merging into the nozzle portions 8 or blanking pieces 9, as applicable to their disposition on the skirt assembly. Each pair of flexible tubes 11 is interconnected by a V-shaped flexible diaphragm 15 which, by acting as a tension member, constrains the tubes to a V-shape and provides for additional stiffness in a plane parallel to the lateral axis of the machine.

The uppermost ends of the tubes 11 and the holes 7 in attachment sheet 6 are arranged to be coincident and the tubes 11 are affixed to the attachment sheet 6 by means of attachment flanges 12, the parts being bonded together prior to installation on the machine.

The attachment sheet 6 may comprise a plurality of overlapping segments releasably joined together by bolting or other suitable method, such that units consisting of a segment of the attachment sheet 6 and one or more of the components 1 or 2, according to the size of the segment, may be releasably removed and replaced.

Figure 5:
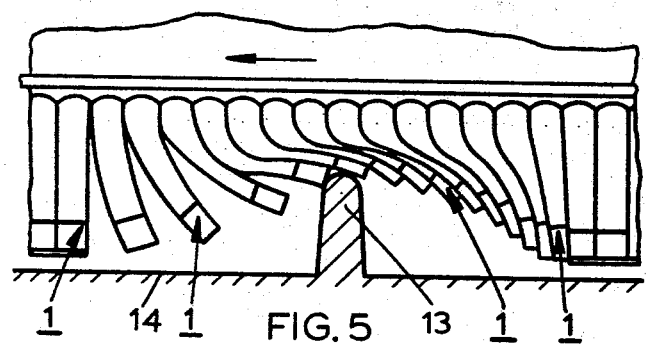
FIGURE 5 is a fragmentary view of a ground effect machine according to the invention showing a portion of the flexible skirting assembly deflected by an obstruction.

In operation of a ground effect machine provided with a plurality of flexible members, as hereinbefore described, the action of the memebrs 1 and 2 when passing over an obstacle in a forward direction is illustrated in FIGURE 5. The flexible components 1, shown by way of example, are attached to the rigid part of a machine moving in the direction of the arrow, which is in a direction parallel to the longitudinal axis of the machine. On encountering obstacle 13 in these circumstances, each member 1 will flex easily in the opposite direction, thereby allowing the machine to pass over the obstacle 13 without damage being caused to the skirt or underportions. As soon a member 1 or 2 has cleared the obstacle 13 it will return quickly to its natural near vertical position, by virtue of the pressurised air or gas within it. Similarly, should the machine be moving backwards the members 1 or 2 will flex in the forward direction. When the machine is moving sideways relative to an obstacle, or crabwise, the flexible members 1 or 2, having greater resistance to bending in a plane transverse to the machine than in a fore-and-aft plane, will prefer to part and those flexible members forwards of the obstacle will flex towards the bow of the machine, and those aft of the obstacle will flex towards the stern. Thus in this mode also the machine will pass over the obstacle without damage to skirt assembly and with the minimum of skirt displacement and drag.

It will now be apparent that the V-shaped or triangular construction of the skirt members 1 or 2, when installed with their narrow sides transverse to the longitudinally disposed air ducts, provides, a greater resistance to buckling when the machine strikes an object when moving sideways, and this feature contributes an important step in the art, since it forms a self-supporting skirt which is not likely to become caught up on obstacles and incurs the minimum drag by more localised deflection.

It will also be apparent that various refinements and modifications may be effected to the constructions hereinbefore described, without departing from the scope of the invention. For example, the flexible members 1 or 2 may depend directly from the rigid part of the structure of the machine, thus dispensing with the aforementioned attachment sheet, or they may depend from any other suitable porous attachment sheet, such as wire gauze, or a sheet provided with holes supplying more than one of said skirt members. Alternatively, they may depend from any flexible assembly in such a way that they form only the lower portion of the flexible barrier. Members similar to keel members 2 may be utilised to form a peripheral skirt, where it is not desirable for pressurised air to issue from the base of the skirt, as in the case of plenum chamber machines. Furthermore, such members need not be inflatable as are those hereinbefore described, but may be filled with foam rubber or the like, or made from a suitable solid flexible material moulded into a similar form. Fabrication in short sections with several skirt members moulded to an attachment sheet in one piece is also within the scope of the invention.

We claim as our invention:

1. A flexible understructure for a ground effect machine, comprising a plurality of flexible members for depending contiguously from a ground effect machine to form a wall extending longitudinally in the general fore-and-aft direction of the machine, each of said members having a V configuration when viewed in elevation longitudinally of the wall and a substantially untapered configuration when viewed in elevation transversely of the wall, the horizontal extent of the upper portion of each member as viewed transversely of the wall being substantially less than the horizontal extent of the upper portion of the member as viewed longitudinally of the wall, whereby each member is more flexible in the fore-and-aft direction of the wall than in a direction transversely of the wall.

2. Apparatus as claimed in claim 1 wherein at least some of said flexible members are inflatable.

3. A skirt arrangement for a ground effect machine as claimed in claim 2 wherein the inflatable flexible members of said substantially V configuration each comprise a member providing a single cavity.

4. A skirt arrangement for a ground effect machine comprising flexible wall structures which constrain and retain the cushion upon which the machine is supported, said wall structures including a plurality of flexible members which have greater resistance to bending in one plane than in another plane, each of said members being of substantially V configuration when viewed in side elevation, at least some of said flexible members being inflatable, and each inflatable flexible member of said substantially V configuration having a bifurcated duct, the arms of the bifurcation being attached one to the other by a diaphragm member to prevent increase in their relative divergence during operation.

5. A skirt assembly for a ground effect machine including a plurality of flexible members having greater resistance to bending in the plane transverse to the machine than in the fore and aft plane, said members depending contiguously from the underside of the machine to form a wall, characterized in that each of said flexible members consists of at least two flexible tubes extending from a resilient membrane and being spaced apart at their upper ends and being merged and joined together as a single tube at their lower ends.

6. Apparatus as claimed in claim 5 wherein said flexible tubes are hollow and inflatable.

7. In combination with a ground effect machine having a base structure and means for generating a supporting fluid cushion under the base structure, a flexible understructure comprising a plurality of flexible members depending contiguously from said base structure to form a wall extending longitudinally in the general fore-and-aft direction of the machine, each of said members having a V configuration when viewed in elevation longitudinally of the wall and a substantially untapered configuration when viewed in elevation transversely of the wall, the horizontal extent of the upper portion of each member as viewed transversely of the wall being substantially less than the horizontal extent of the upper portion of the member as viewed longitudinally of the wall, whereby each member is more flexible in the fore-and-aft direction of the wall than in a direction transversely of the wall.

8. Apparatus as claimed in claim 7 wherein at least some of said members are at least partially hollow and inflatable.

9. Apparatus as set forth in claim 8 wherein at least some of said inflatable members include outlet nozzles at the bottom thereof through which pressurized air may be discharged from the base structure.

10. Apparatus as set forth in claim 7 wherein at least some of said members comprise two flexible tubes converging downwardly and toward each other from said base structure and merging together at their lower ends, and joined together by a flexible diaphragm.

11. Apparatus as set forth in claim 10 wherein at least one of the said tubes of each flexible member is hollow and inflatable.

12. Apparatus as set forth in claim 11 wherein at least some of said flexible members which comprise two flexible tubes have a nozzle formed at the bottom thereof through which air is discharged from the hollow inflatable tube.

13. A skirt arrangement for a ground effect machine comprising flexible wall structures which constrain and retain the cushion upon which the machine is supported, said wall structures comprising pluralities of flexible members depending contiguously beneath the machine and providing greater resistance to bending in one plane than in another plane, each of said members being of substantially V configuration when viewed in side elevation and being of greater height than its span, each of said flexible members being inflatable, whereby a gaseous fluid enters at the top of the V and passes toward the foot thereof, some of said inflatable flexible members having flexible jet nozzles in their lower extremities, and others of said inflatable flexible members being substantially sealed.

References Cited

UNITED STATES PATENTS

| | | | |
|---|---|---|---|
| 3,216,519 | 11/1965 | Prickett | 180—7 |
| 3,249,167 | 5/1966 | Tibbetts | 180—7 |
| 3,254,731 | 6/1966 | Schreiber | 180—7 |
| 3,265,144 | 8/1966 | Shaw | 180—7 |

FOREIGN PATENTS

| | | |
|---|---|---|
| 962,995 | 7/1964 | Great Britain. |

A. HARRY LEVY, *Primary Examiner.*